C. W. POLEN.
Garden-Hoe.
No. 203,643. Patented May 14, 1878.
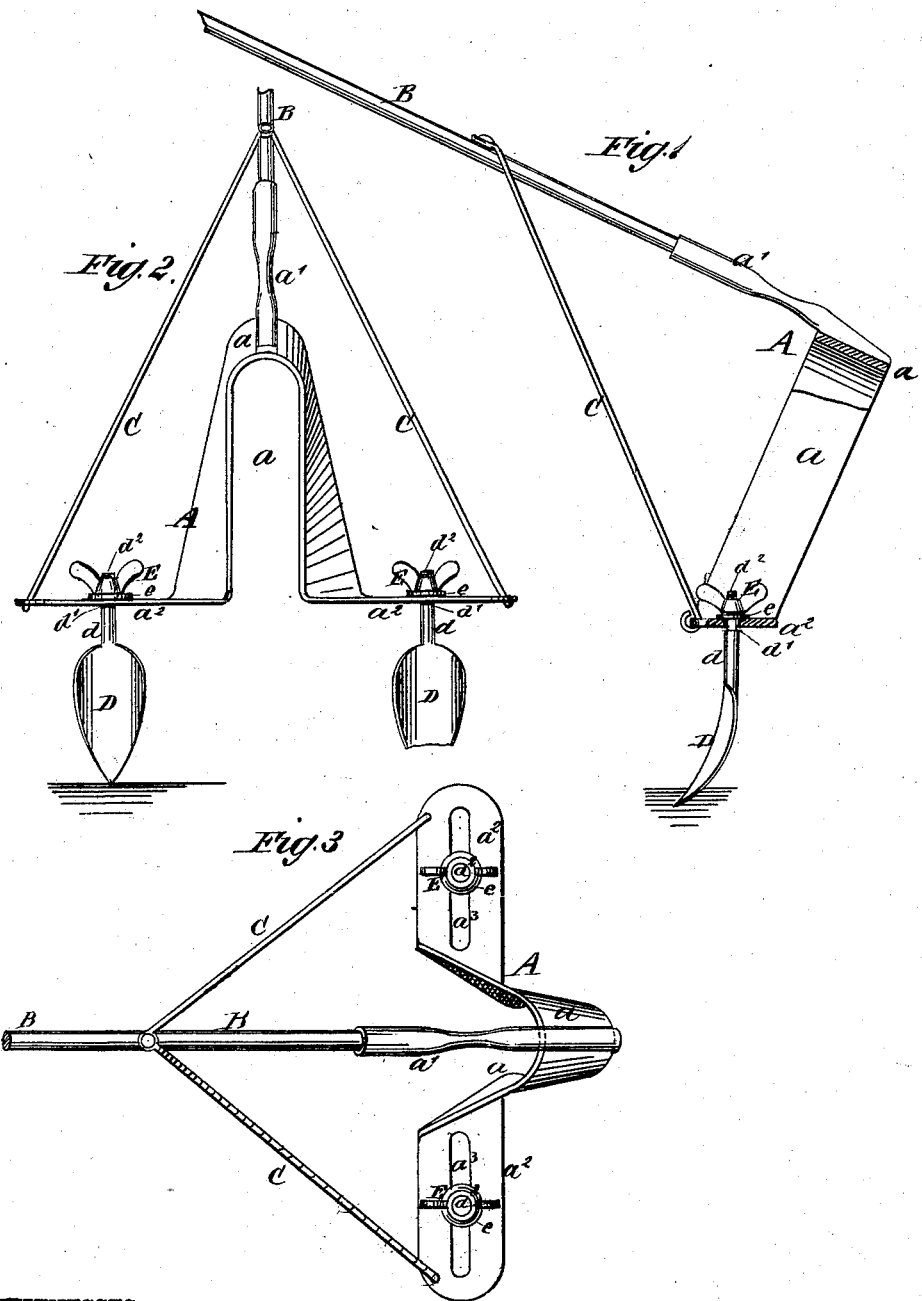
WITNESSES:
INVENTOR:
C. W. Polen
BY
ATTORNEYS.

UNITED STATES PATENT OFFICE.

CALVIN W. POLEN, OF HAZEL DELL, ILLINOIS.

IMPROVEMENT IN GARDEN-HOES.

Specification forming part of Letters Patent No. 203,643, dated May 14, 1878; application filed March 29, 1878.

*To all whom it may concern:*

Be it known that I, CALVIN W. POLEN, of Hazel Dell, in the county of Cumberland and State of Illinois, have invented a new and Improved Garden-Hoe, of which the following is a specification:

The object of my invention is to furnish a strong, cheap, and light double garden-hoe for cultivating young plants in drills, and which may be adjusted to suit different distances between the rows, and to throw the soil to or from the plants, as desired.

The invention will first be described in connection with the drawing, and then pointed out in the claim.

In the accompanying drawing, Figure 1 is a side view, partly in section, of my improved garden-hoe. Fig. 2 is a rear view, and Fig. 3 a top view, of the same.

Similar letters of reference indicate corresponding parts.

The frame A of the hoe is made of a malleable-iron plate, the center of which is an open arch, $a$, in the shape of an inverted U, flaring at its front edge, as seen in the drawing, to allow and facilitate the passing of the implement over the row of plants without injury to the latter. On the top of the arch $a$ is formed a socket, $a^1$, for the reception of the handle B, and at the base of the arch $a$, on each side thereof, the frame A is provided with a horizontal arm, $a^2$, having a longitudinal slot, $a^3$, and connected to the handle B by a strengthening-brace, C.

D are the hoes, each provided with a vertical central shank, $d$, whose upper end is turned down to a smaller diameter, thus forming shoulder $d^1$, and a bolt, $d^2$, the latter being threaded and provided with a thumb-nut, E, underneath which may be placed a washer, $e$.

The hoes are fastened to the frame A by introducing the threaded bolts $d^2$ from the under side into the slots $a^3$ of the arms $a^2$, and applying the thumb-nuts E, to clamp the plate $a^2$ between themselves (or the washers $e$) and the shoulders $d^1$. By this construction the hoes D may be fastened in any position in the slots $a^3$, equidistant from the center of the frame A, and corresponding to the distance between the rows, and the hoes may be turned on their bolt $d^2$, and fastened in positions of horizontal inclination to or from the vertical center line of the frame and the row of plants, in order to throw the soil up to the row of plants on both sides simultaneously, or throw it off from the plants, as may be desired.

Having thus described my invention, I claim as new and desire to secure by Letters Patent—

The hand-bar frame A, consisting of a plate, with the open arch $a$, the socket $a^1$, and the horizontal slotted arms $a^2$ $a^3$, in combination with handle B, braces C, and hoes D, substantially as shown and described.

CALVIN WESLEY POLEN.

Witnesses:
GARRETT M. MITCHELL,
WILLIAM J. KELLY.